US012705073B2

(12) United States Patent
Zhang

(10) Patent No.: US 12,705,073 B2
(45) Date of Patent: Aug. 11, 2026

(54) PROCESSING METHOD AND ELECTRONIC DEVICE

(71) Applicant: Lenovo (Beijing) Limited, Beijing (CN)

(72) Inventor: Liang Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 184 days.

(21) Appl. No.: 18/453,001

(22) Filed: Aug. 21, 2023

(65) Prior Publication Data

US 2024/0069938 A1 Feb. 29, 2024

(30) Foreign Application Priority Data

Aug. 31, 2022 (CN) ........................ 202211069171.0

(51) Int. Cl.

| | |
|---|---|
| ***G06F 3/048*** | (2013.01) |
| ***G06F 3/04817*** | (2022.01) |
| ***G06F 3/0486*** | (2013.01) |
| ***G06F 9/451*** | (2018.01) |

(52) U.S. Cl.

CPC .......... *G06F 9/451* (2018.02); *G06F 3/04817* (2013.01); *G06F 3/0486* (2013.01)

(58) Field of Classification Search

CPC ..... G06F 9/451; G06F 3/04817; G06F 3/0489
See application file for complete search history.

(56) References Cited

U.S. PATENT DOCUMENTS

| | | | | |
|---|---|---|---|---|
| 11,422,678 | B2 * | 8/2022 | Kim | G06F 3/04845 |
| 11,714,520 | B2 * | 8/2023 | Hwang | G06F 3/04886 715/780 |
| 2010/0088634 | A1 * | 4/2010 | Tsuruta | G06F 3/0481 715/788 |
| 2014/0164957 | A1 * | 6/2014 | Shin | H04L 65/403 715/806 |
| 2014/0164966 | A1 * | 6/2014 | Kim | G06F 16/168 715/769 |
| 2014/0245203 | A1 * | 8/2014 | Lee | G06F 3/04845 715/765 |
| 2019/0065031 | A1 * | 2/2019 | Kang | G06F 3/04817 |
| 2019/0324603 | A1 * | 10/2019 | Shin | G06F 3/04886 |
| 2020/0004387 | A1 * | 1/2020 | Kim | G06F 3/0486 |
| 2020/0183574 | A1 * | 6/2020 | Chen | G06F 3/04883 |
| 2022/0057932 | A1 * | 2/2022 | Kim | G06F 3/0481 |
| 2022/0083203 | A1 * | 3/2022 | Zhi | G06F 3/0486 |

(Continued)

*Primary Examiner* — Linh K Pham
(74) *Attorney, Agent, or Firm* — ANOVA LAW GROUP, PLLC

(57) ABSTRACT

A processing method includes displaying a target region, and responding to a target instruction to display a plurality of target windows based on the plurality of target icons. Displaying the target region represents a first layout of a plurality of target icons included in the target region. Each target icon of the plurality of target icons is used to launch an application corresponding to the target icon. A target window includes an interactive interface of the application that is in a running state corresponding to the target icon. Displaying the plurality of target windows represents a second layout of the plurality of target windows. A position relationship of the plurality of target icons represented by the first layout is same as the position relationship of the plurality of target windows represented by the second layout.

14 Claims, 15 Drawing Sheets

(56) References Cited

U.S. PATENT DOCUMENTS

2022/0179525 A1* 6/2022 Naito .................... G06F 3/0481
2023/0017891 A1* 1/2023 Kim .................... G06F 3/04842
2025/0130825 A1* 4/2025 Liu ....................... G06F 3/0484

* cited by examiner

PROCESSING METHOD AND ELECTRONIC DEVICE

CROSS-REFERENCE TO RELATED APPLICATION

This application claims priority to Chinese Patent Application No. 202211069171.0, filed on Aug. 31, 2022, the entire content of which is incorporated herein by reference.

TECHNICAL FIELD

The present disclosure relates to the application technology field and, more particularly, to a processing method and an electronic device.

BACKGROUND

With the development of smart apparatuses, smartphones are used broadly. A plurality of application icons are arranged on an interface of a smartphone. Each application icon corresponds to an application. When an application icon is clicked, a corresponding application is launched on the smartphone.

Currently, to quickly and conveniently launch the application, a special icon is arranged on the interface. One special icon corresponds to a plurality of applications. When the special icon is clicked, the corresponding plurality of applications are simultaneously launched on the smartphone. Application windows of the plurality of applications are arranged on the interface in a specific layout.

SUMMARY

Embodiments of the present disclosure provide a processing method. The method includes displaying a target region and responding to a target instruction to display a plurality of target windows based on the plurality of target icons. Displaying the target region represents a first layout of a plurality of target icons included in the target region. Each target icon of the plurality of target icons is used to launch an application corresponding to the target icon. A target window includes an interactive interface of the application that is in a running state corresponding to the target icon. Displaying the plurality of target windows represents a second layout of the plurality of target windows. A position relationship of the plurality of target icons represented by the first layout is same as the position relationship of the plurality of target windows represented by the second layout.

Embodiments of the present disclosure provide a processing method. The method includes displaying a target region, the target region including a plurality of target icons, in response to a first target instruction, displaying a plurality of target windows based on the plurality of target icons, and in response to a second target instruction, displaying one target window based on one target icon of the plurality of target icons.

Embodiments of the present disclosure provide an electronic device, including a memory and a processor. The memory stores a computer program and data generated by executing the computer program that, when the computer program is executed by the processor, causes the processor to display a target region, and respond to a target instruction to display a plurality of target windows based on the plurality of target icons. Displaying the target region represents a first layout of a plurality of target icons included in the target region. Each target icon of the plurality of target icons is used to launch an application corresponding to the target icon. A target window includes an interactive interface of the application that is in a running state corresponding to the target icon. Displaying the plurality of target windows represents a second layout of the plurality of target windows. A position relationship of the plurality of target icons represented by the first layout is same as the position relationship of the plurality of target windows represented by the second layout.

DETAILED DESCRIPTION OF THE EMBODIMENTS

Embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

Figure 1:
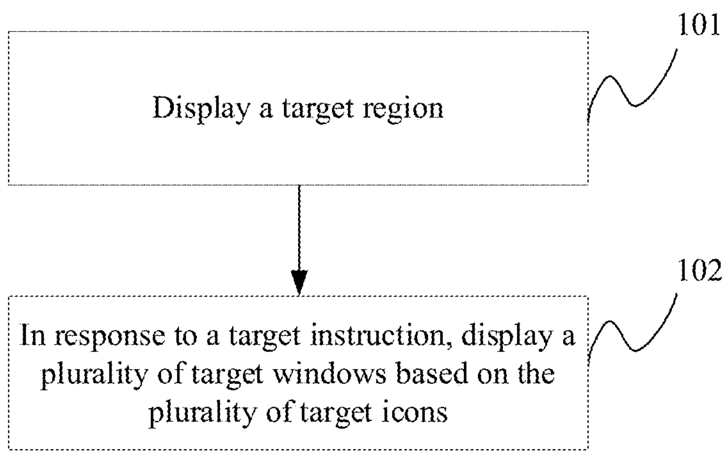
FIG. 1 illustrates a schematic flowchart of a processing method according to some embodiments of the present disclosure.

FIG. 1 illustrates a schematic flowchart of a processing method according to some embodiments of the present disclosure. The method can be applied to an electronic device with a display for content display, such as a laptop.

In some embodiments, the method includes the following steps.

At 101, a target region is displayed.

Displaying the target region can represent a first layout of a plurality of target icons included in the target region. Each target icon of the plurality of target icons can be used to launch an application corresponding to the target icon.

Figure 2:
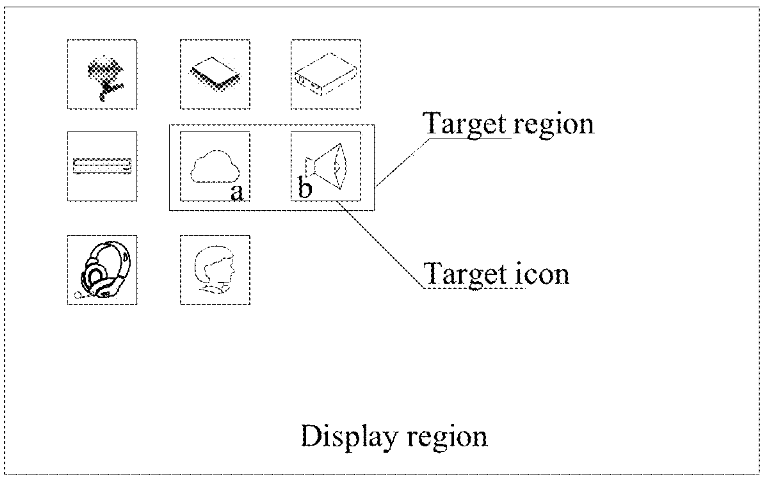
FIG. 2 illustrates a schematic diagram of displaying a target region according to some embodiments of the present disclosure.

For example, as shown in FIG. 2, a target region is displayed in a display region provided by the display of the electronic device. The target region includes a plurality of target icons arranged in the first layout. Each target icon of the plurality of target icons corresponds to an application. When the target icon is selected, the application corresponding to the target icon can be launched on the electronic device.

The first layout can represent a position relationship between the plurality of target icons, such as a left-right relationship or a top-bottom relationship. As shown in FIG. 2, two target icons are arranged left and right in the first layout.

At 102, in response to a target instruction, a plurality of target windows are displayed based on the plurality of target icons.

A target window can include an interactive interface of the application in a running state corresponding to the target icon. The plurality of target windows can be displayed to represent a second layout of the plurality of target windows.

Figure 3:
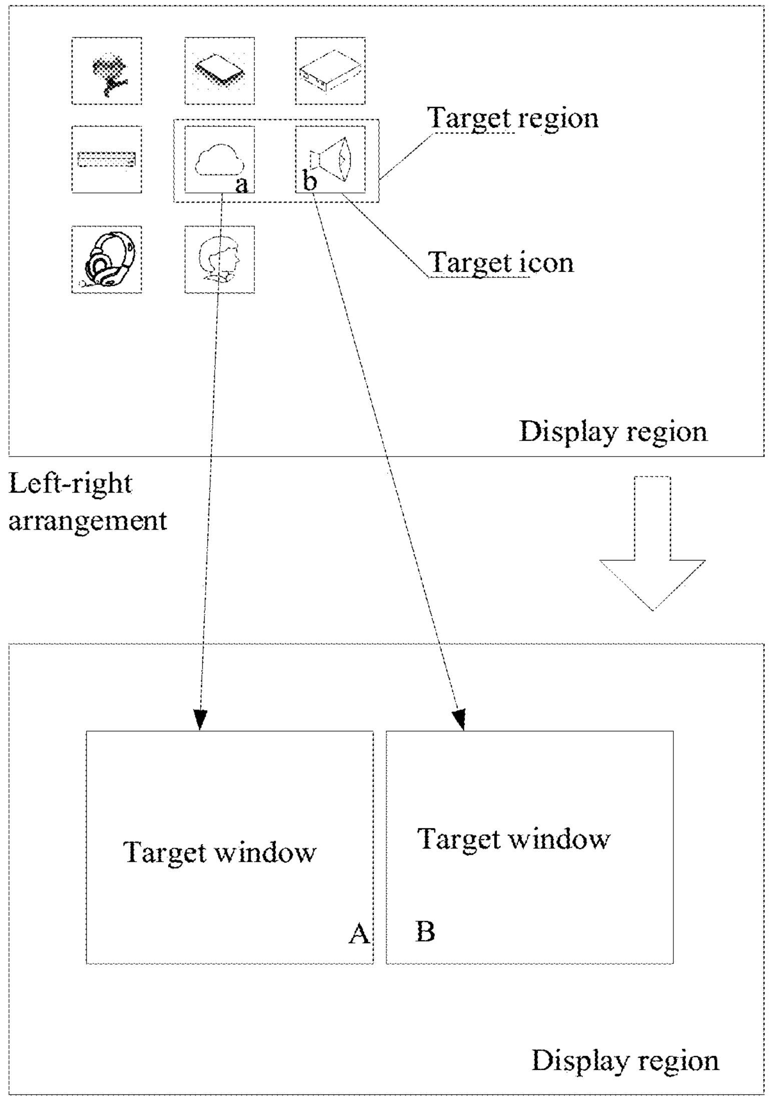
FIG. 3 illustrates a schematic diagram of displaying a target window according to some embodiments of the present disclosure.

For example, as shown in FIG. 3, in response to receiving the target instruction, the plurality of target windows are displayed in the display area. Each target window of the plurality of target windows corresponds to a target icon in the target region. The target window is the interactive interface of the application in the running state corresponding to the target icon. The plurality of target windows can be arranged in the second layout. For example, the target window can include a dialog box of a chat application or a video broadcast window of a video application.

The second layout can represent a position relationship between the plurality of target windows, for example, the left-right relationship and a top-bottom relationship. The position relationship of the plurality of target windows represented by the second layout can be same as the position relationship of the plurality of target icons represented by the first layout. As shown in FIG. 3, two target windows are arranged left and right in the second layout.

In addition, window areas of the plurality of target windows can be partially blocked or completely unblocked.

In the method of embodiments of the present disclosure, the plurality of target icons can be displayed in the target region in the first layout. Thus, when the target instruction is received, the target windows corresponding to the target icons can be displayed according to the position relationship of the target icons represented by the first layout. Thus, even if the target windows corresponding to the target icons are not displayed, a user can know the position relationship between the target windows according to the position relationship between the target icons in the target region, which can improve the user experience for the electronic device.

In some embodiments, the target instruction in step 102 can be referred to as a first target instruction. In response to the first target instruction, the plurality of target windows can be displayed based on the plurality of target icons. However, in some embodiments, a second target instruction can be provided. The second target instruction can be an instruction for one target icon in the target region. Thus, in response to the second target instruction, one target window can be displayed based on the one target icon of the plurality of target icons, i.e., the target icon corresponding to the second target instruction. The displayed target window can be a target window of an application corresponding to the target icon corresponding to the second target instruction. That is, in some embodiments, for the target region including the plurality of target icons, the plurality of target windows corresponding to the plurality of target icons can be displayed according to the position relationship between the plurality of target icons in the target region in response to the first target instruction for the target region. In some other embodiments, only the target window of the application corresponding to the target icon corresponding to the second target instruction in the target region can be displayed in response to the second target instruction for the one target icon in the target region.

In some embodiments, before responding to the target instruction, applications corresponding to some target icons can be in the running state and applications corresponding to the other target icons can be in an inactive state, or the applications corresponding to all the target icons can be in the running state, or the applications corresponding to all the target icons can be in the inactive state.

In some embodiments, when the applications corresponding to all the target icons are in the inactive state, step 102 can include responding to the target instruction to launch the plurality of applications corresponding to the plurality of target icons to display the plurality of target windows based on the plurality of target icons.

That is, in some embodiments, in response to the target instruction, each application corresponding to each target icon can be launched to display the target window corresponding to the target icon. The position relationship between the target windows can be consistent with the position relationship between the plurality of target icons in the target region.

In some other embodiment, when the applications corresponding to all the target icons are in the running state, step 102 can include responding to the target instruction to display a target window corresponding to each target icon in the second layout based on the plurality of target icons.

That is, in some embodiments, in response to the target instruction, the target windows of the applications corresponding to the target icons that are in the running state can be adjusted from minimized positions, maximized positions, or other positions to be aligned with the target windows corresponding to the other target icons to be in the position relationship represented by the second layout.

In some other embodiments, when applications corresponding to some target icons are in the running state, while applications corresponding to the other target icons are in the inactive state, Step 102 can include, for the applications corresponding to the plurality of target icons, responding to the target instruction to launch the applications that are not launched to display the target windows of the applications that are launched and adjust the positions of the target windows of the applications that are in the running state to cause the target windows to be in the position relationship represented by the second layout. The plurality of target icons can correspond to the plurality of applications. Thus, the plurality of target windows can be displayed.

The plurality of target windows can be displayed on the same display. On the display, the position relationship between the plurality of target windows can be consistent with the position relationship between the corresponding target icons in the target region. In some other embodiments, the plurality of target windows can be displayed on different sub-displays, and the position relationship between the sub-displays can be consistent with the position relationship between the corresponding target icons in the target region.

The position relationship between the target windows can be represented by the relationship between coordinate points in the same positions of the plurality of target windows. For example, the position relationship between the target windows can be represented by the relationship between coordinates of top-left points of the plurality of target windows.

Figure 4:
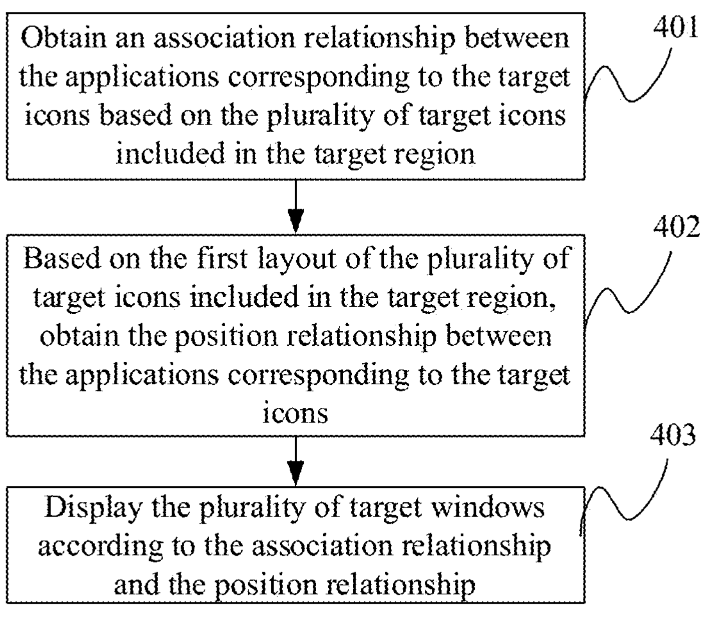
FIG. 4 and FIG. 5 illustrate partial schematic flowcharts of a processing method according to some embodiments of the present disclosure.

In some embodiments, in step 102, responding to the target instruction to display the plurality of target windows based on the plurality of target icons includes the following steps as shown in FIG. 4.

At 401, an association relationship between the applications corresponding to the target icons is obtained based on the plurality of target icons included in the target region.

For example, as shown in FIG. 2, the target region includes two target icons, i.e., target icon A and target icon B. Application A and application B corresponding to the two target icons have an association relationship.

At 402, Based on the first layout of the plurality of target icons included in the target region, the position relationship between the applications corresponding to the target icons is obtained.

For example, as shown in FIG. 2, target icon a and target icon b have a left-right position relationship. Thus, application A and application B have a left-right position relationship.

At 403, the plurality of target windows are displayed according to the association relationship and the position relationship.

For example, as shown in FIG. 3, according to the association relationship and the left-right position relationship between application A and application B, the target windows of application A and application B are displayed in the display region. The target window of application A and the target window of application B have a left-right position relationship.

Figure 5:
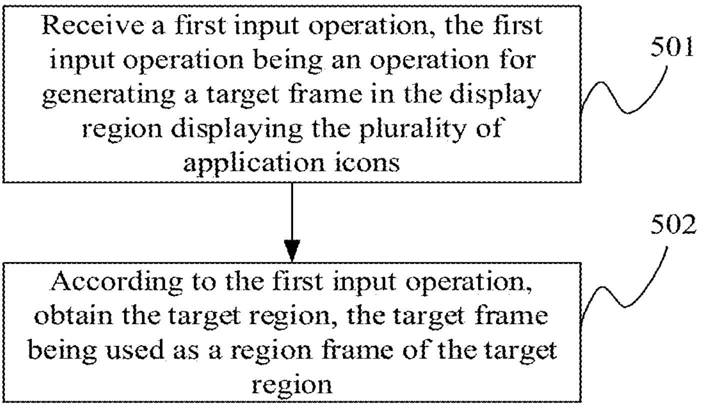

In some embodiments, as shown in FIG. 5, the target region including the plurality of target icons can be obtained as follows.

At 501, a first input operation is received. The first input operation is an operation for generating a target frame in the display region displaying the plurality of application icons.

A plurality of target icons can be displayed in the target frame. The plurality of target icons can be in a third layout in the display region.

Figure 6:
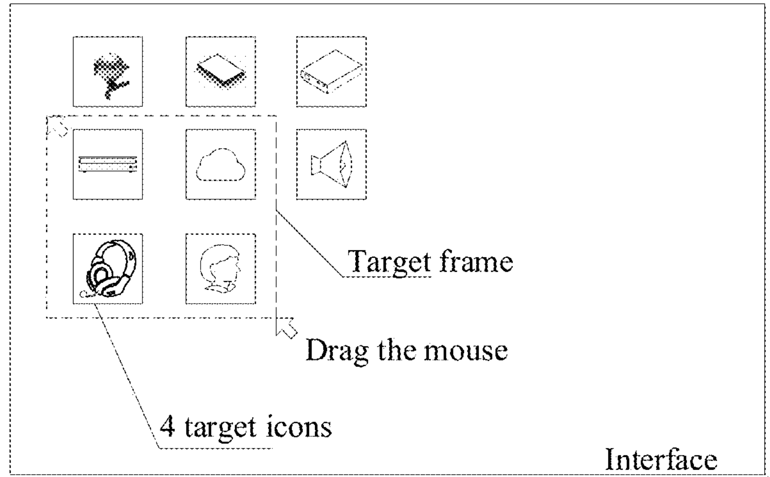
FIGS. 6 to 12 illustrate schematic diagrams of editing a target region according to some embodiments of the present disclosure.

For example, as shown in FIG. 6, the user can click a left button of a mouse and maintain to drag the mouse on the interface to create a target frame on the interface to select four target icons displayed in the target frame. The target icons are in the third layout, e.g., a top-bottom layout.

At 502, according to the first input operation, the target region is obtained. The target frame is used as a region frame of the target region.

The position relationship of the plurality of target icons represented by the first layout can be the same as the position relationship of the plurality of target icons represented by the third layout.

Figure 7:
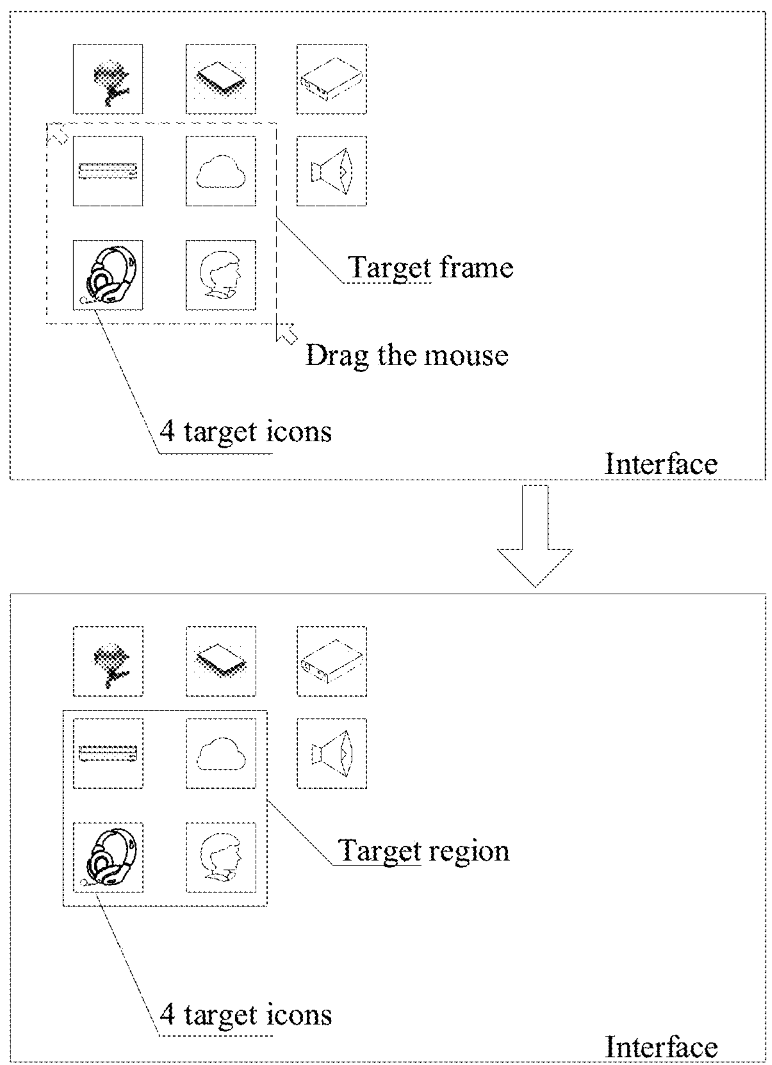

For example, as shown in FIG. 7, after the user uses the mouse to form the target frame on the interface to select the four target icons, the target region formed by these target icons is obtained based on the third layout between the target icons within the target frame. The target icons in the target region can be arranged in the third layout the same as the first layout, e.g., the top-bottom layout or the left-right layout.

Figure 8:
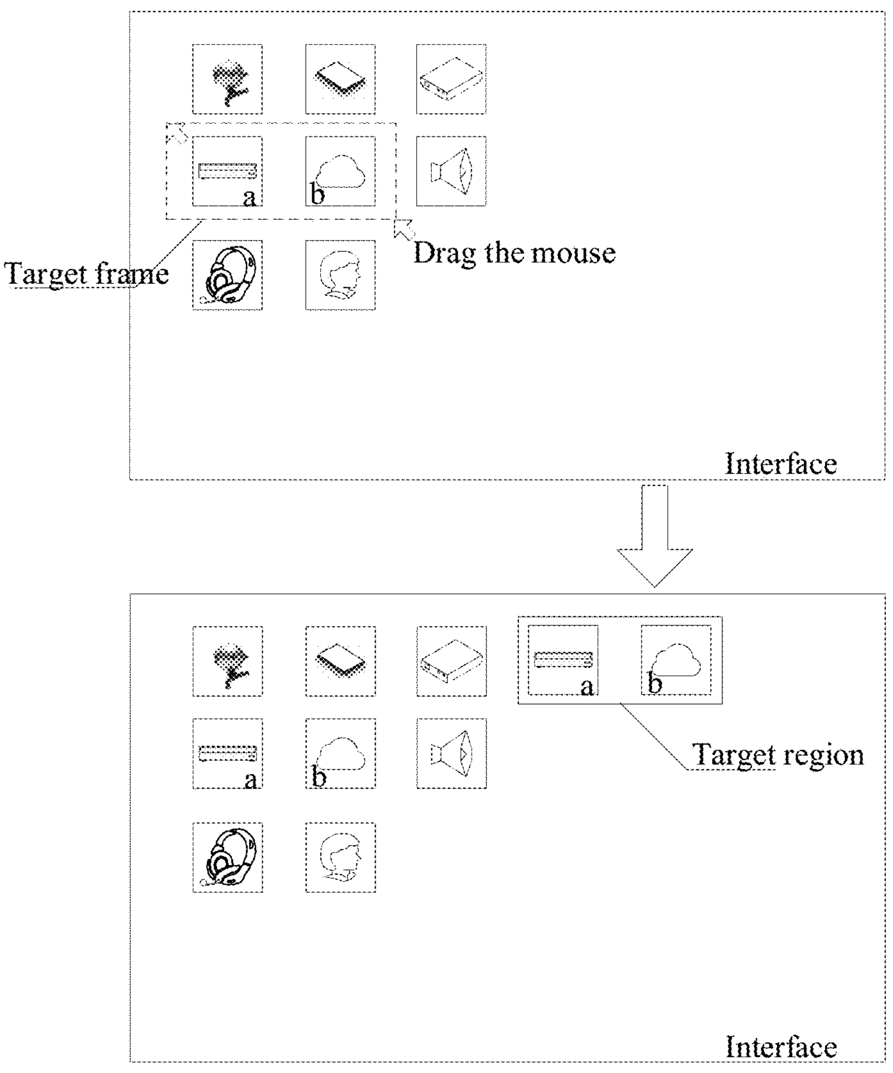

The plurality of target icons in the target region can be independent of the original application icons in the display region. Each target icon can be displayed in both the display region and the target region. That is, the display region displays the independent target icons as well as the target icons included within the target region. For example, as shown in FIG. 8, after dragging the mouse to select target icon a and target icon b into the target frame, the obtained target region exists independently. The target region is displayed in a blank space of the display region, while the display region still displays independent target icon a and target icon b.

Furthermore, the sizes of the target icons in the target region can be the same as the sizes of the target icons in the display region.

Figure 9:
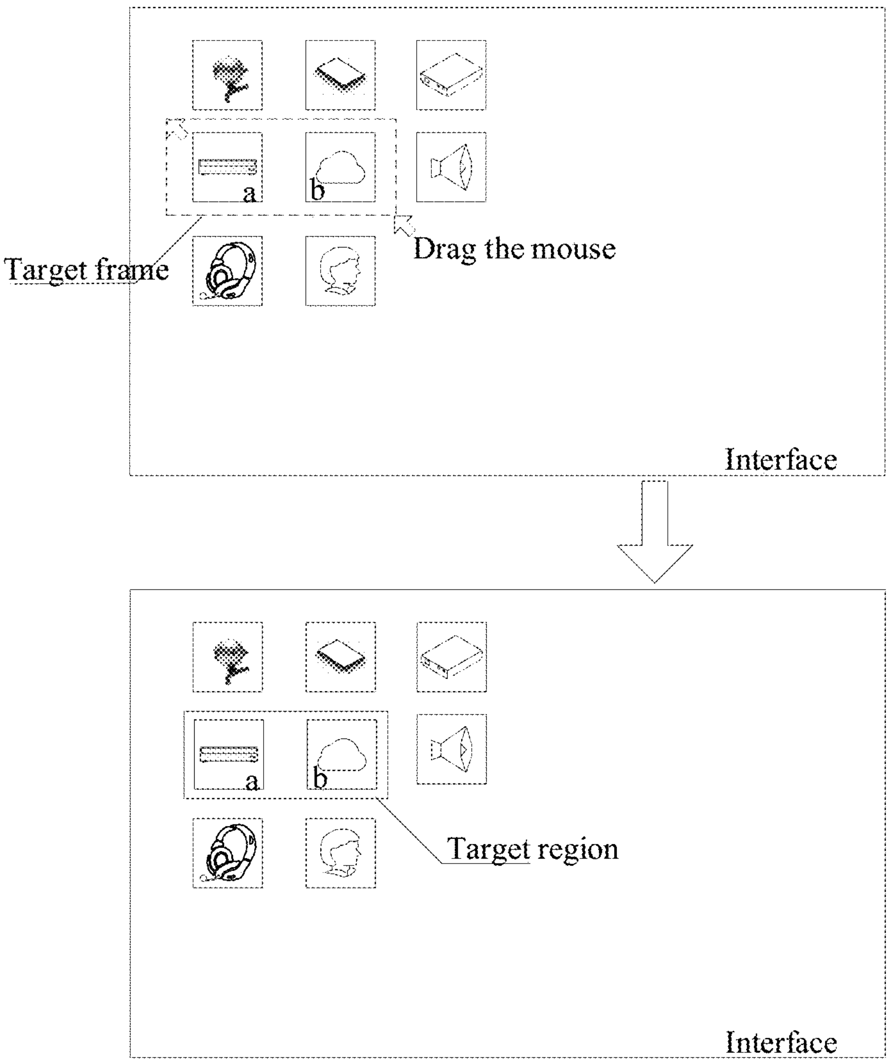

In some other embodiments, each target icon is only displayed in the display region. For example, as shown in FIG. 9, after selecting target icon a and target icon b into the target frame, the obtained target region remains at an original position. In the display region, target icon a and target icon b are only displayed in the target region.

Based on the above, when the target region is in an editable state, the method of embodiments of the present disclosure can further include deleting a first icon in the target region in response to receiving a second input operation, the remaining target icons in the target region being in a new first layout. The second input operation can be used to drag the first icon in the target region to a first position outside of the target frame.

Figure 10:
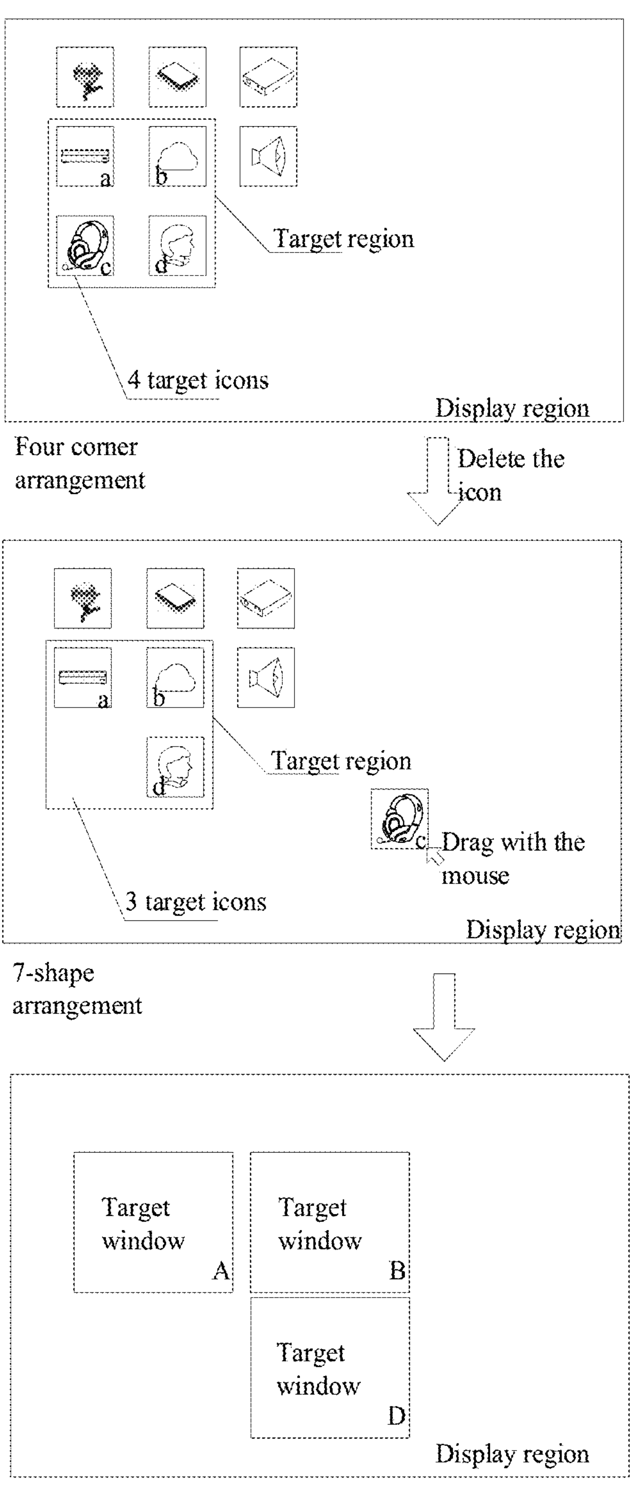

That is, when the target region is in the editable state, the user can drag the first icon in the target region to delete the first icon in the target region. For example, as shown in FIG. 10, four target icons are arranged at four corners in the target region. When the target region is in the editable state, the user can drag target icon c to a blank space of the display region to cause target icon a, target icon b, and target icon d to remain in the target region. The top-bottom layout and the left-right layout between the target icons in the target region change. Target icon a, target con b, and target icon d are arranged in a 7-shape. Based on this, after responding to the target instruction, target windows corresponding to application A, application B, and application D corresponding to target icon a, target icon b, and target icon d can be arranged in the 7-shape, respectively.

Based on the above, when the target region is in the editable state, the method of embodiments of the present disclosure can further include receiving a third input operation and adding a second icon in the display region to the target region to form a new first layout with the target icons. The third input operation can be used to drag the second icon in the target region to a second position in the target frame.

Figure 11:
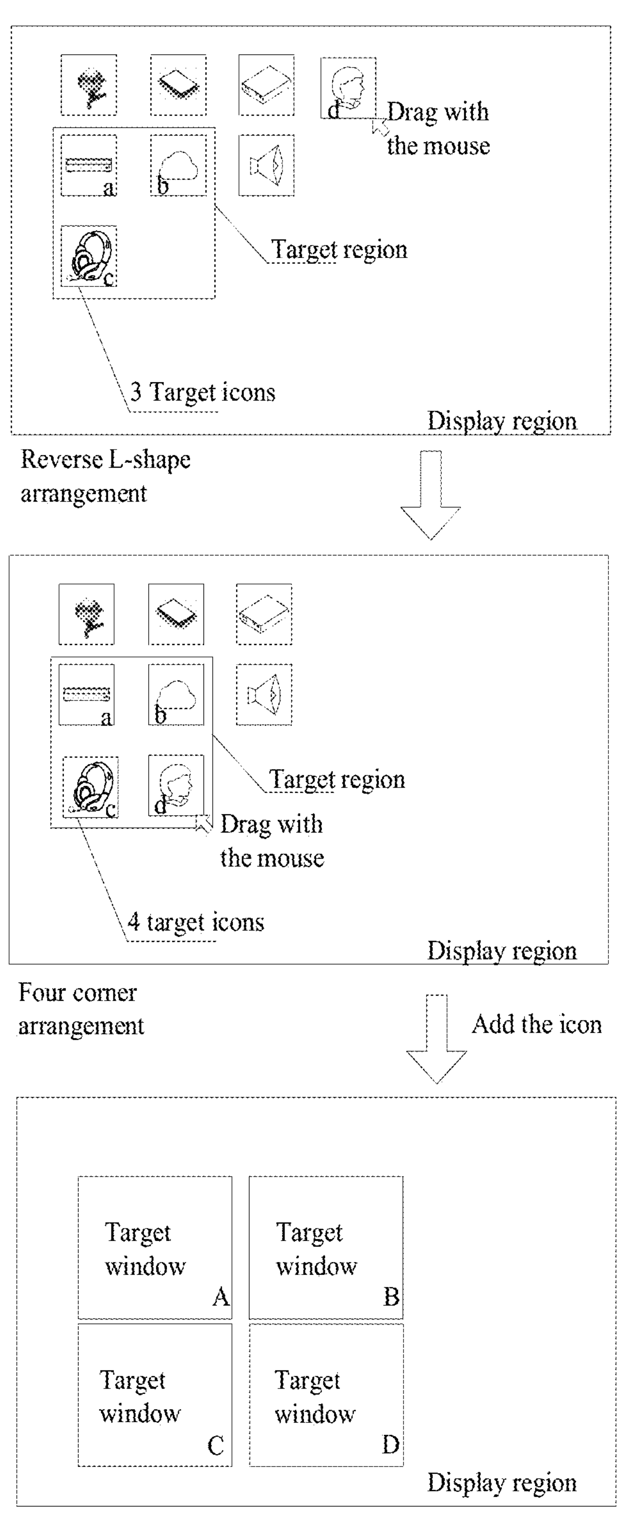

That is, when the target region is in the editable state, the user can drag the second icon in the display region to add the second icon to the target region. For example, as shown in FIG. 11, three target icons are in the target region, and the target region is in the editable state. The user drags application icon d in the display region into the target region. Thus, the target region includes target icon a, target icon b, target icon c, and target icon d. The layout in a reverse L-shape of target icon a, target icon b, and target icon d changes. Target icon a, target icon b, target icon c, and target icon d are arranged at four corners. Based on this, after responding to the target instruction, target windows corresponding to application A, application B, application C, and application D corresponding to target icon a, target icon b, target icon c, and target icon d can be also arranged at four corners.

Based on the above, when the target region is in the editable state, the method of embodiments of the present disclosure can further include receiving a fourth input operation and updating the first layout of the plurality of target icons in the target region. The fourth input operation is at least used to drag a third icon in the target region from a third position to a fourth position in the target region.

Figure 12:
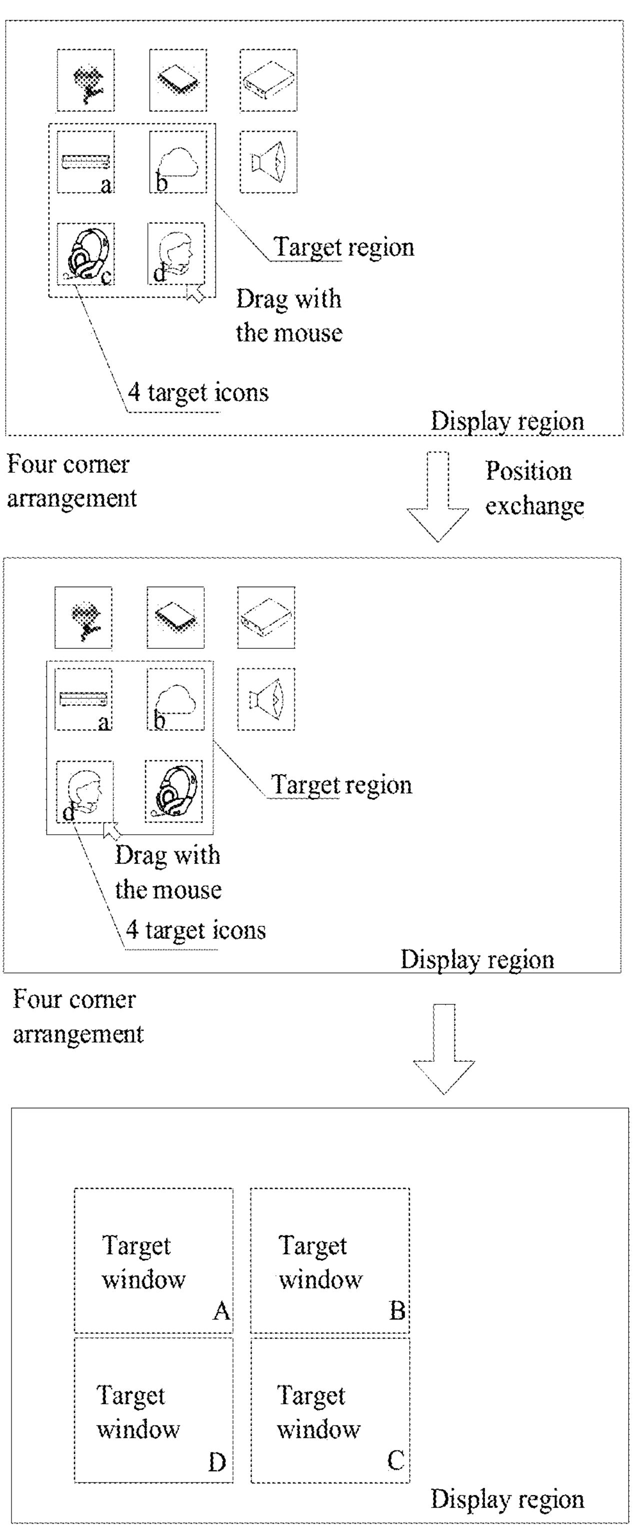

That is, when the target region is in the editable state, the user can drag the third icon in the target region to move the third icon from the third position to the fourth position in the target region. For example, as shown in FIG. 12, the target region includes four target icons. When the target region is in the editable state, the user drag target icon c to the right to cause target icon d to move to the left to cause target icon a, target icon b, target icon c, and target icon d in the target region to be still arranged at the four corners. However, the position of target icon c and the position of target icon d are exchanged. Based on this, after responding to the target instruction, target windows corresponding to application A, application B, application C, and application D corresponding to target icon a, target icon b, target icon c, and target icon d can be still arranged at the four corners. However, the position of the target window corresponding to application C and the position of the target window corresponding to application D are exchanged.

Based on the above, when the target region is in a locked state, the first layout of the plurality of target icons included in the target region can be fixed. Based on this, when any position within the target region is clicked and the target region is dragged, the displacements of the target region and the plurality of target icons can remain consistent. That is, the target region can be dragged as a whole to change the position.

Figure 13:
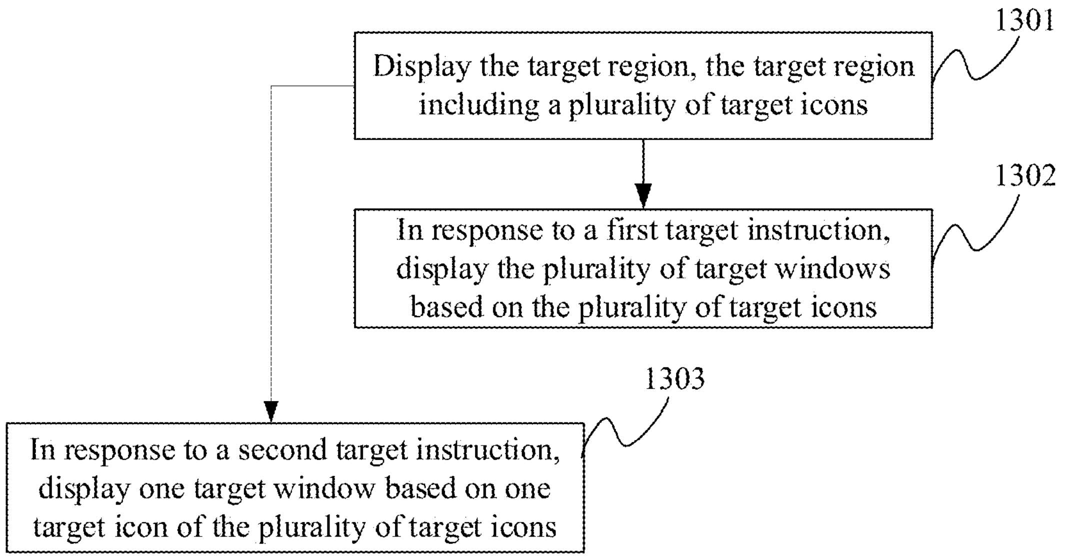
FIG. 13 illustrates another part of a schematic flowchart of a processing method according to some embodiments of the present disclosure.

FIG. 13 illustrates another part of a schematic flowchart of a processing method according to some embodiments of the present disclosure. The method can be applied to the electronic device with a display for content display, e.g., a laptop.

In some embodiments, the method of embodiments of the present disclosure includes the following steps.

At 1301, the target region is displayed. The target region includes a plurality of target icons.

At 1302, in response to a first target instruction, the plurality of target windows are displayed based on the plurality of target icons.

At 1303, in response to a second target instruction, one target window is displayed based on one target icon of the plurality of target icons.

That is, in some embodiments, for the target region including the plurality of target icons, in response to the first target instruction for the target region, the plurality of target windows corresponding to the target icons can be displayed. In some other embodiments, in response to the second target instruction for the one target icon in the target region, only the target window of the application corresponding to the target icon corresponding to the second target instruction in the target region can be displayed.

Furthermore, in some embodiments, in response to the first target instruction for the target region, the plurality of target windows corresponding to the target icons can be displayed according to the position relationship between the plurality of target icons in the target region. The first layout of the plurality of target icons in the target region can be consistent with the second layout of the plurality of target windows corresponding to the plurality of target icons.

Figure 14:
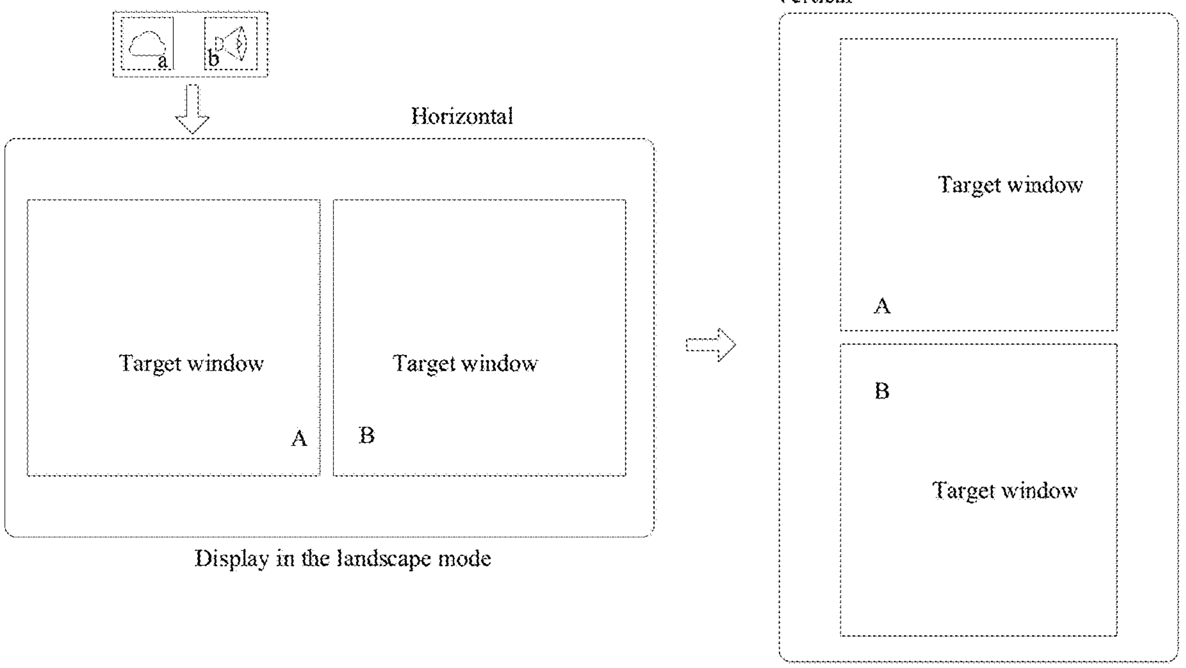
FIG. 14 and FIG. 15 illustrate schematic diagrams of switching a vertical or horizontal screen according to some embodiments of the present disclosure.

In some embodiments, the display region can be rectangular. Thus, the display region can include a landscape mode and a portrait mode. In some embodiments, the display region can be in the landscape mode, and the plurality of target windows can be displayed in the landscape mode in response to the first target instruction. If the display region is switched to the portrait mode, the arrangement of the plurality of target windows may not be adjusted in embodiments of the present disclosure. That is, the plurality of target windows can be displayed vertically in the display region in the portrait mode. Thus, the position relationship between the plurality of target windows can be different from the position relationship of the corresponding target icons in the target region. For example, as shown in FIG. 14, when the display is in the landscape mode, according to the position relationship of target icon a and target icon b in the target region, in response to the first target instruction, the target windows of application A and application B can be displayed horizontally on the display. If the display is then adjusted to the portrait mode, the positions of the target window of application program A and the target window of application program B can remain the same.

Figure 15:
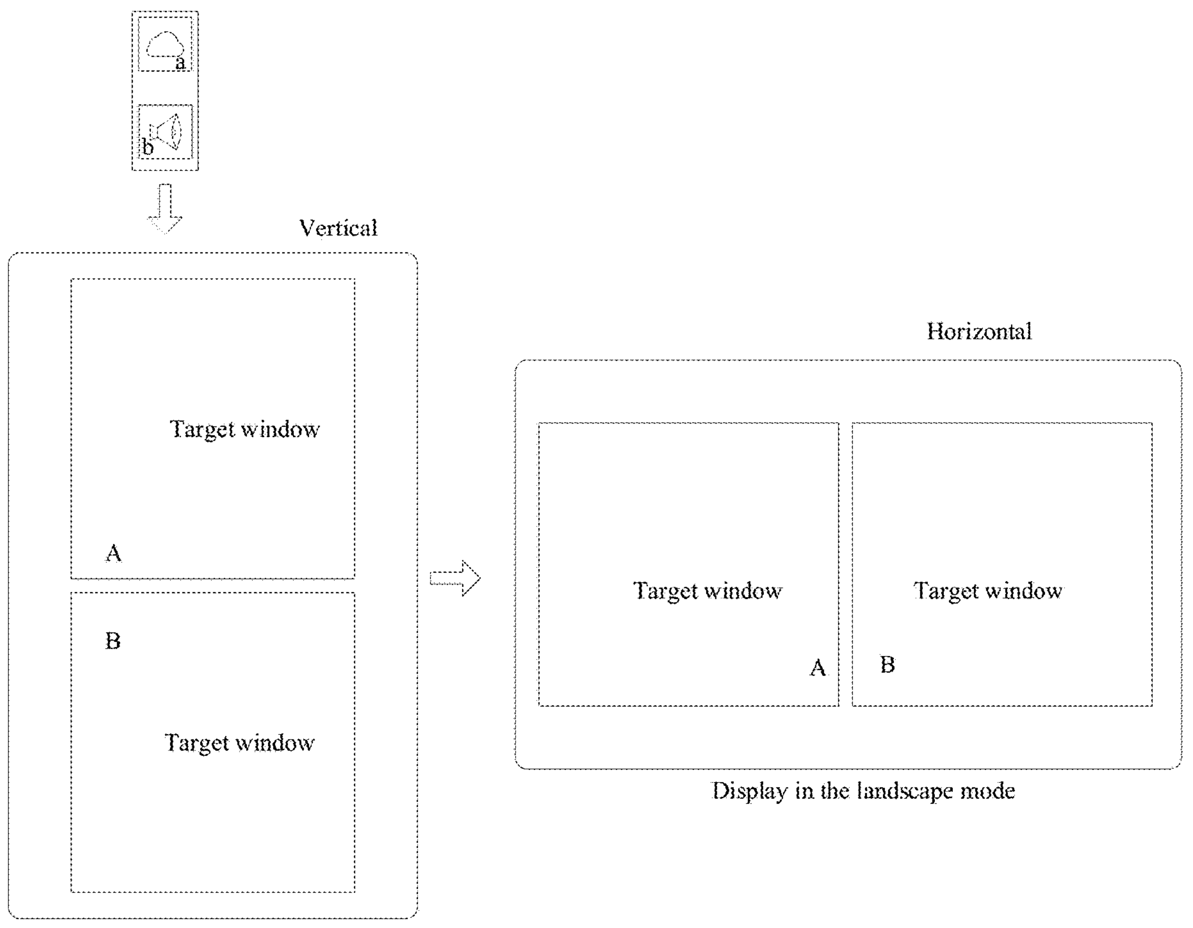

In some other embodiments, the display region can be in the portrait mode, and the plurality of target windows can be displayed vertically in response to the first target instruction. If the display region is switched to the landscape mode, the arrangement of the plurality of target windows may not be adjusted in embodiments of the present disclosure. That is, the plurality of target windows can be displayed horizontally within the display region in landscape mode. Thus, the position relationship between the plurality of target windows can be different from the position relationship between the corresponding target icons in the target region. For example, as shown in FIG. 15, when the display is in the portrait mode, according to the position relationship of target icon a and target icon b in the target region, in response to the first target instruction, the target windows of application A and application B can be displayed vertically on the display. If the display is then adjusted to the landscape mode, the positions of the target window of application A and the target window of application B can remain unchanged.

Figure 16:
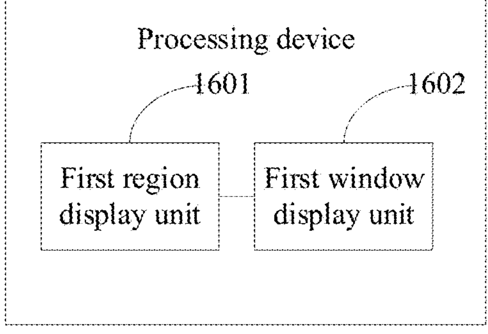
FIG. 16 illustrates a schematic structural diagram of a processing device according to some embodiments of the present disclosure.

FIG. 16 illustrates a schematic structural diagram of a processing device according to some embodiments of the present disclosure. The device can be configured in the electronic device, such as a cell phone, a tablet, a computer, etc. The device of embodiments of the present disclosure includes a first region display unit 1601 and a first window display unit 1602.

The first region display unit 1601 can be configured to display the target region. Displaying the target region can represent the first layout of the plurality of target icons included in the target region. Each of the plurality of target icons can be used to launch an application corresponding to the target icon.

The first window display unit 1602 can be configured to respond to the target instruction to display the plurality of target windows based on the plurality of target icons. The target windows include interactive interfaces of applications in the running state corresponding to the target icons. Displaying the plurality of target windows can represent the second layout of the plurality of target windows. The position relationships between the plurality of target icons represented by the first layout can be the same as the position relationships between the plurality of target windows represented by the second layout.

According to the above, embodiments of the present disclosure provide a processing device. The processing device can be configured to display the plurality of target icons in the target region in the first layout. Thus, when receiving the target instruction, the processing device can display the target windows corresponding to the target icons according to the position relationship represented by the first layout. Thus, even without displaying the target windows corresponding to the target icons, the user can know the position relationship between the target windows according to the position relationships between the target icons in the target region. Therefore, the user experience of the electronic device can be improved.

In some embodiments, the first window display unit 1602 can be configured to respond to the target instruction to launch the plurality of applications corresponding to the plurality of target icons based on the plurality of target icons to display the plurality of target windows.

In some embodiments, the first window display unit 1602 can be further configured to obtain the association relationship between the applications corresponding to the target icons based on the plurality of target icons included in the target region, obtain the position relationship between the applications corresponding to the target icons based on the first layout of the plurality of target icons included in the target region, and display the plurality of target windows according to the association relationship and the position relationship.

In some embodiments, the first region display unit 1601 can be further configured to receive the first input operation. The first input operation can be used as the operation of generating the target frame in the display region that displays the plurality of application icons. The plurality of target icons can be included in the target frame. The plurality of target icons can be arranged in the third layout in the display region. The first region display unit 1601 can be further configured to obtain the target region according to the first input operation. The target region can use the target frame as the region frame. The position relationship of the plurality of target icons represented by the first layout can be same as the position relationship of the plurality of target icons represented by the third layout.

In some embodiments, the first region display unit 1601 can be further configured to receive the second input operation when the target region is in the editable state. The second input operation can be used to drag the first icon in the target region to the first position outside the target frame. The first region display unit 1601 can be further configured to delete the first icon in the target region. The remaining target icons in the target region can be in a new first layout.

In some embodiments, the first region display unit 1601 can be further configured to receive the third input operation. The third input operation can be used to drag the second icon in the display region to the second position within the target frame. The first region display unit 1601 can be further configured to add the second icon to the target region. The second icon and the target icons can be in a new first layout.

In some embodiments, the first region display unit 1601 can be further configured to receive the fourth input operation when the target region is in the editable state. The fourth input operation can be used to drag the third icon in the target region from the third position to the fourth position within the target region. The first region display unit 1601 can be further configured to update the first layout of the plurality of target icons in the target region according to the fourth position of the third icon.

In addition, when the target region is in a locked state, the first layout of the plurality of target icons included in the target region can remain fixed.

Specific implementations of the units of embodiments of the present disclosure can refer to the corresponding content above and are not be described in detail here.

Figure 17:
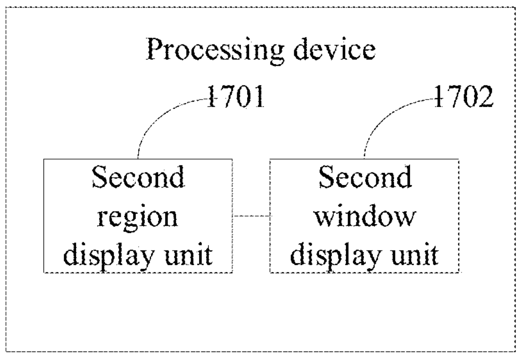
FIG. 17 illustrates a schematic structural diagram of another processing device according to some embodiments of the present disclosure.

FIG. 17 illustrates a schematic structural diagram of another processing device according to some embodiments of the present disclosure. The device can be configured in the electronic device, such as a cell phone, a tablet, a computer, etc. The device includes a second region display unit 1701 and a second window display unit 1702.

The second region display unit 1701 can be configured to display the target region. The target region can include the plurality of target icons.

The second window display unit 1702 can be configured to respond to the first target instruction to display plurality of target windows based on the plurality of target icons or respond to the second target instruction to display one target window corresponding to one target icon of the plurality of target icons.

That is, in some embodiments, for the target region including the plurality of target icons, the device can respond to the first target instruction to display the plurality of target windows corresponding to the target icons or respond to the second target instruction for the one target icon in the target region to display only the target window of the application corresponding to the target icon corresponding to the second target instruction in the target region.

In addition, in some embodiments, in response to the first target instruction for the target region, the plurality of target windows corresponding to the target icons can be displayed according to the position relationship between the plurality of target icons in the target region. The first layout between the plurality of target icons in the target region can be consistent with the second layout of the plurality of target windows corresponding to the plurality of target icons.

Figure 18:
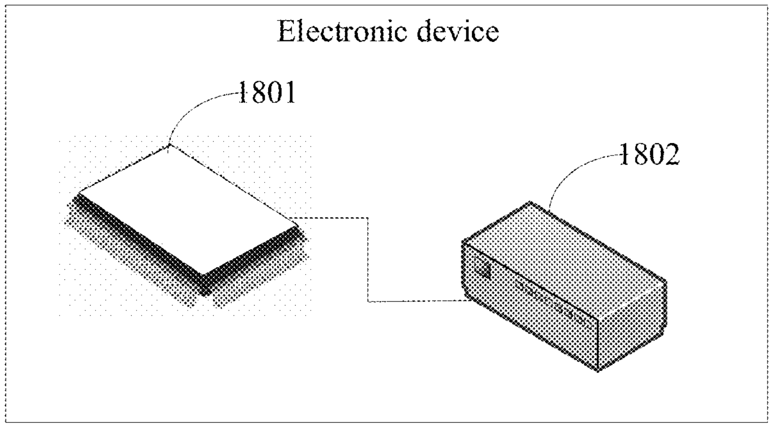
FIG. 18 illustrates a schematic structural diagram of an electronic device according to some embodiments of the present disclosure.

FIG. 18 illustrates a schematic structural diagram of an electronic device according to some embodiments of the present disclosure. The electronic device can include a cell phone, a tablet, a computer, etc. The electronic device includes a memory 1801 and a processor 1802.

The memory 1801 can be used to store a computer program and data generated by executing the computer program.

The processor 1802 can be configured to execute the computer program to display the target region. Displaying the target region can be used to represent the first layout of the plurality of target icons included in the target region. Each of the plurality of target icons can be used to launch an application corresponding to the target icon. The processor 1802 can be further configured to respond to the target instruction to display the plurality of target windows based on the plurality of target icons. The target window can include the interactive interface of the application in the running state corresponding to the target icon. Displaying the plurality of target windows can be used to represent the second layout of the plurality of target windows. The position relationship between the plurality of target icons represented by the first layout can be the same as the position relationship between the plurality of target windows represented by the second layout.

According to the above, embodiments of the present disclosure provide an electronic device. The electronic device can be configured to display the plurality of target icons in the first layout in the target region, and receive the target instruction to display the target windows corresponding to the target icons according to the position relationship of the target icons represented by the first layout. Thus, even if the target windows corresponding to the target icons are not displayed, the user can know the position relationship between the target windows according to the position relationship between the target icons in the target region. Thus, the user experience of the electronic device can be improved.

Figure 19:
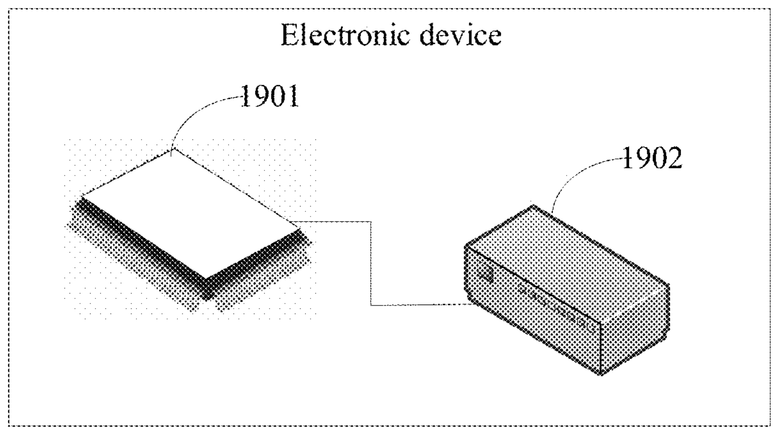
FIG. 19 illustrates a schematic diagram showing another electronic device according to some embodiments of the present disclosure.

FIG. 19 illustrates a schematic diagram showing another electronic device according to some embodiments of the present disclosure. The electronic device can include a cell phone, a tablet, a computer, etc. The electronic device includes a memory 1901 and a processor 1902.

The memory 1901 can be configured to store a computer program and data generated by executing the computer program.

The processor 1902 can be configured to execute the computer program to display the target region. The target region can include the plurality of target icons. The processor 1902 can be further configured to respond to the first target instruction to display the plurality of target windows based on the plurality of target icons or respond to the second target instruction to display one target window based on one target icon of the plurality of target icons.

For example, the electronic device can be the cell phone. In embodiments of the present disclosure, problems of how to cause the user to directly know an application that is to be launched from a launch icon (i.e., the target region) before launching a plurality of applications that are running in groups, and a relative arrangement of the plurality of applications after being launched can be solved.

For the above problems, in the present disclosure, shapes and arrangement of desk icons can be visually consistent with an initial arrangement of the plurality of applications after being launched. Thus, the user can easily and directly see a visual effect after the applications are launched, which can also be easily identified from the interface.

Figure 20:
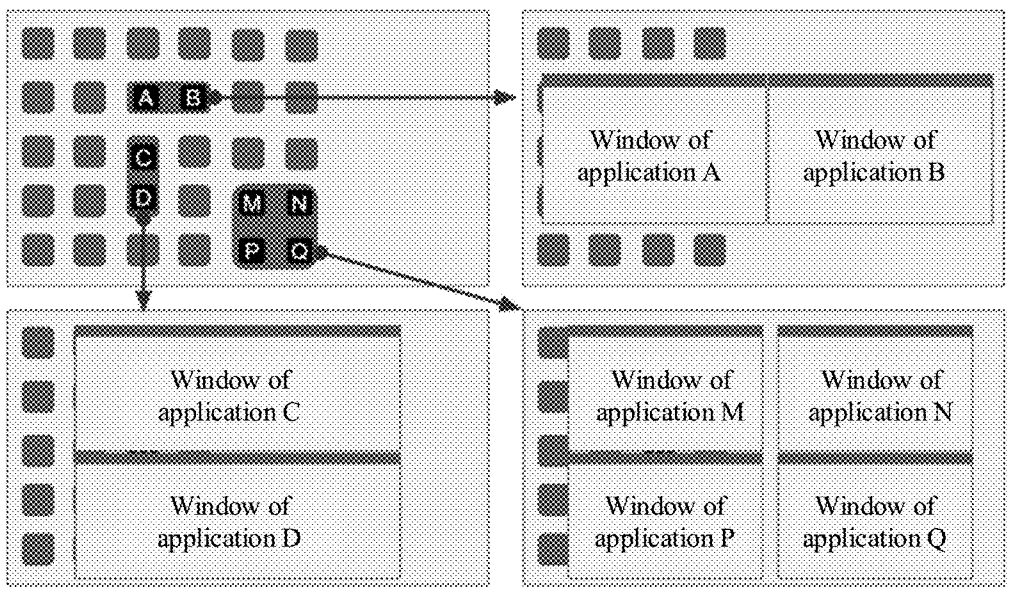
FIG. 20 illustrates a schematic diagram showing application icons and windows of a cell phone display combination according to some embodiments of the present disclosure.

As shown in FIG. 20, for example, assume that the user wants to associate and launch application A and application B in a left-right arrangement, the launch icon (i.e., the target region) on the interface can be a container having a row and two columns, which includes icons of application A and application B. The arrangement of the icons of application A and application B can be then indicated by displaying the target region (e.g., the display on the current interface). For example, the two icons can be arranged left-right. The icon of application A is on the left, and the icon of application B is on the right. Once the trigger operation for the launch icon (i.e., the target region) is obtained, application A and application B can be associated and launched to display the interactive interface of application A and the interactive interface of application B in two windows. The arrangement of the two windows can be consistent with the arrangement of the icons of application A and application B in the target region. For example, the two windows are arranged left-right. The window of application A is on the left, and the window of application B is on the right. Thus, displaying the target region can indicate the arrangement of the icons of application A and application B and also indicate the arrangement of displaying the interactive interface of application A and the interactive interface of application B after application A and application B are associated and launched.

Assume that the user wants to associate and launch application C and application D in a top-bottom arrangement, the launch icon (i.e., the target region) on the interface can be a container having a row and two columns, which includes icons of application C and application D. The top and bottom positions can correctly correspond to the top and bottom positions after application C and application D are launched.

Assume that the user wants to associate and launch four applications M, N, P, and Q in a top-bottom and left-right arrangement, the launch icon (i.e., the target region) on the interface can be a container having two rows and two columns, which includes icons of application M, application N, application P, and application Q. the top-bottom and left-right positions can correctly correspond to the top-bottom and left-right positions after application M, application N, application P, and application Q are launched.

For any icon on the above interface, in response to the triggering instruction, the corresponding application can be launched to display the interactive interface of the application in the window, which can include the icons in the target region and icons outside the target region. That is, for the icon included in the target region, in response to the trigger instruction for the icon, the corresponding application can be individually launched, or in response to the trigger instruction for the target region, the corresponding application can be associated and launched.

Embodiments of the present disclosure are progressively described. Each embodiment highlights the differences from other embodiments. Similar parts or features between different embodiments can be referred to each other. For the device of embodiments of the present disclosure, since device embodiments correspond to method embodiments, the device embodiments are described simply. The related parts can be referred to the description of the method embodiments.

Those skilled in the art can know that units and algorithm steps of embodiments of the present disclosure can be implemented by electronic hardware, computer software, or a combination thereof. To describe the interchangeability of the hardware and the software, the composition and steps of embodiments of the present disclosure are generally described according to the functions in the specification. Whether these functions are executed by hardware or software depends on the specific application and design restrictive condition of the technical solution. Those skilled in the art can use different methods for each specific application to implement the described functions, which should not be considered to exceed the scope of the present disclosure.

The methods or algorithm steps of embodiments of the present disclosure can be directly implemented using hardware, a software module executed by the processor, or a combination thereof. The software module can be stored in a random-access memory (RAM), memory, a read-only memory (ROM), an electrically programmable ROM, an electrically erasable programmable ROM, a register, a hard disk, a removable disk, a CD-ROM, or any other form of storage medium known in the art.

The above description of embodiments of the present disclosure can enable those skilled in the art to implement or use the present disclosure. Various modifications to the embodiments are apparent to those skilled in the art. The general principles defined herein can be implemented in other embodiments without departing from the spirit or scope of the present disclosure. Therefore, the present disclosure is not limited to embodiments of the present disclosure but conforms to the widest scope consistent with the principles and novel features of the present disclosure.

What is claimed is:

1. A processing method comprising:

receiving a first input operation, the first input operation generating a target frame on a display region displaying a plurality of application icons, wherein the generating the target frame comprises dragging on the display region to draw the target frame such that a first plurality of target icons of the plurality of application icons are within the target frame;

obtaining a target region according to the first input operation, wherein the target region corresponds to the target frame as a region frame;

displaying, in the display region, the target region and at least one application icon outside the target region, wherein displaying the target region represents a first layout of a plurality of target icons included in the target region, the plurality of target icons correspond to the first plurality of target icons within the target frame, each target icon of the plurality of target icons is used to launch an application corresponding to the target icon, and each target icon of the plurality of target icons and each application icon of the at least one application icon have substantially a same display size in the display region;

responding to a target instruction to display a plurality of target windows based on the plurality of target icons, wherein a target window includes an interactive interface of the application that is in a running state corresponding to the target icon, and displaying the plurality of target windows represents a second layout of the plurality of target windows, wherein a position relationship of the plurality of target icons represented by the first layout is same as the position relationship of the plurality of target windows represented by the second layout; and when the target region is in an editable state, in response to receiving a second input operation, dragging a first icon in the target region to a first position outside the target frame, deleting the first icon from the target region, and arranging remaining target icons in a new first layout in the target region.

2. The method according to claim 1, wherein responding to the target instruction to display the plurality of target windows based on the plurality of target icons includes: responding to the target instruction to launch a plurality of applications corresponding to the plurality of target icons based on the plurality of target icons to display the plurality of target windows.

3. The method according to claim 1, wherein responding to the target instruction to display the plurality of target windows based on the plurality of target icons includes: obtaining an association relationship between application corresponding to the plurality of target icons based on the plurality of target icons included in the target region; obtaining a position relationship between the applications corresponding to the plurality target icons based on the first layout of the plurality of target icons included in the target region; and displaying the plurality of target windows according to the association relationship and the position relationship.

4. The method according to claim 1, further comprising:

wherein the first plurality of target icons are arranged in the display region in a third layout; and a position relationship of the plurality of target icons represented by the first layout is same as a position relationship of the first plurality of target icons represented by the third layout.

5. The method according to claim 4, further comprising, when the target region is in the editable state:

in response to receiving a third input operation, dragging a second icon in the display region to a second position within the target frame, adding the second icon to the target region, and arranging the second icon with the target icons in a new first layout.

6. The method according to claim 4, further comprising, when the target region is in the editable state:

in response to receiving a fourth input operation, dragging a third icon from a third position to a fourth position in the target region, and updating the first layout of the plurality of target icons in the target region according to the fourth position of the third icon.

7. The method according to claim 4, wherein when the target region is in a locked state, the first layout of the plurality of target icons included in the target region is fixed.

8. An electronic device comprising:

a processor; and a memory storing a computer program and data generated by executing the computer program that, when the computer program is executed by the processor, causes the processor to:

receive a first input operation, the first input operation generating a target frame on a display region displaying a plurality of application icons, wherein the generating the target frame comprises dragging on the display region to draw the target frame such that a first plurality of target icons of the plurality of application icons are within the target frame;

obtaining a target region according to the first input operation, wherein the target region corresponds to the target frame as a region frame;

display, in the display region, the target region and at least one application icon outside the target region, wherein displaying the target region represents a first layout of a plurality of target icons included in the target region, the plurality of target icons correspond to the first plurality of target icons within the target frame, each target icon of the plurality of target icons is used to launch an application corresponding to the target icon, and each target icon of the plurality of target icons and each application icon of the at least one application icon have substantially a same display size in the display region;

respond to a target instruction to display a plurality of target windows based on the plurality of target icons, wherein a target window includes an interactive interface of the application that is in a running state corresponding to the target icon, and displaying the plurality of target windows represents a second layout of the plurality of target windows, wherein a position relationship of the plurality of target icons represented by the first layout is same as the position relationship of the plurality of target windows represented by the second layout; and in response to receiving a second input operation, drag a first icon in the target region to a first position outside the target frame, delete the first icon from the target region, and arrange remaining target icons in a new first layout in the target region.

9. The electronic device according to claim 8, wherein the processor is further configured to:

respond to the target instruction to launch a plurality of applications corresponding to the plurality of target icons based on the plurality of target icons to display the plurality of target windows.

10. The electronic device according to claim 8, wherein the processor is further configured to: obtain an association relationship between application corresponding to the plurality of target icons based on the plurality of target icons included in the target region; obtain a position relationship between the applications corresponding to the plurality target icons based on the first layout of the plurality of target icons included in the target region; and display the plurality of target windows according to the association relationship and the position relationship.

11. The electronic device according to claim 8, wherein the first plurality of target icons are arranged in the display region in a third layout and a position relationship of the plurality of target icons represented by the first layout is same as a position relationship of the plurality of first target icons represented by the third layout.

12. The electronic device according to claim 11, wherein the processor is further configured to:

in response to receiving a third input operation, drag a second icon in the display region to a second position within the target frame, add the second icon to the target region, and arrange the second icon with the target icons in a new first layout.

13. The electronic device according to claim 11, wherein the processor is further configured to: in response to receiving a fourth input operation, drag a third icon from a third position to a fourth position in the target region, and update the first layout of the plurality of target icons in the target region according to the fourth position of the third icon.

14. The electronic device according to claim 11, wherein when the target region is in a locked state, the first layout of the plurality of target icons included in the target region is fixed.

* * * * *